Patented Oct. 17, 1922.

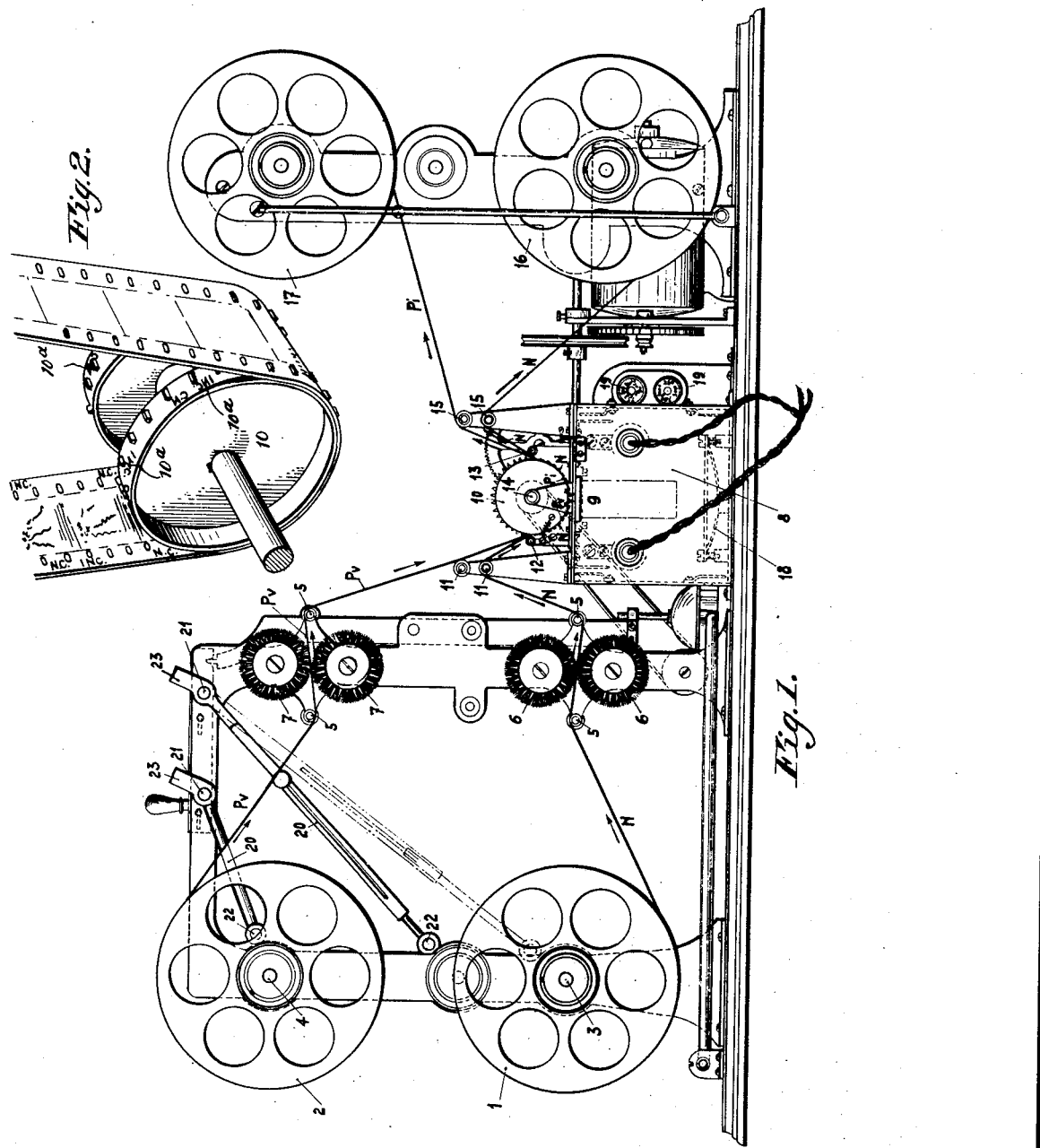

1,432,676

UNITED STATES PATENT OFFICE.

ALFRED DE BRAYER, OF PARIS, FRANCE.

ROTARY MACHINE FOR PRODUCING POSITIVE COPIES OF NEGATIVE CINEMA FILMS.

Application filed April 13, 1922. Serial No. 552,416.

*To all whom it may concern:*

Be it known that I, ALFRED DE BRAYER, a citizen of the Argentine Republic, residing at Paris, in the French Republic, have invented new and useful Improvements in Rotary Machines for Producing Positive Copies of Negative Cinema Films, of which the following is a specification.

Many of the machines actually used for copying negative cinema films are based, more or less, in principle, on the apparatus for taking or projecting (reproducing) cinema views, the mechanical arrangement being much the same in such apparatus. The movement of the films is obtained by grippers or combs, and the obturation is effected by a disc which is sometimes adjustable.

In such machines the films are guided during their upward or downward motion in a channel, or in grooves, the negative and positive films being kept in contact during the exposure by a moving pressing device or by springs. But these organs generally act on one face of the films only, or on their extreme edge, where the perforations are, it being necessary to allow the light to pass freely from the side of the negative. In order to obtain sufficient pressure on the whole surface of the film by such means it is necessary to use a transparent plate (for example glass) placed between the light and the negative and pressing said negative against the positive film. It is evident that any small grain of dust which may happen to stick on such a transparent plate will be reproduced on the positive film and this grain will attain enormous dimensions when projected on the screen. In order to avoid this serious drawback the pressing plates or devices are mostly restricted to the edge of the positive film and such devices hold the films as well as possible before the opening through which the light passes.

With such arrangements it is practically impossible to remove the layer of air shut in between the films, and such films have always the tendency to wind up irregularly because the coatings on the celluloid shrink in drying. Consequently it is impossible to assure that the two coatings adhere properly, that is that a sufficiently tight contact between the negative and positive films is obtained. The result is a defect in the sharpness of the positive picture and often a very disturbing over-softness is obtained, especially when one of the two films has folds or irregularities in the shape.

My present invention relates to a machine for producing positive films in which the defects above mentioned are avoided. The characteristic feature of my invention consists in causing the negative and positive films to describe an arc of a circle, as, by so doing, a perfect contact is obtained between the two films.

The exposure of the positive film is produced by light of the necessary intensity passing through an opening in a case enclosing the lamp.

In the accompanying drawing Figure 1 is a side elevation of the improvement; and Figure 2 is a perspective view on an enlarged scale of the toothed drum and one film.

The negative film N and the positive sensitized film $Pv$ are mounted on reels 1 and 2 carried by the spindles 3 and 4. After leaving these reels N and $Pv$, the films suitably guided by rolls 5, pass between the pairs of rotary brushes 6—6 and 7—7 which turn in the opposite direction to that of the films. By these brushes the films are clean from all dust etc. before passing round the toothed wheel described below.

The lamp used for the exposure is contained in the case 8 from which the light can only issue through a slit opening 9 provided in its forward face. The size of this opening 9 can be varied according to requirements, and the intensity of the light may be varied as required.

The two films N and $Pv$ are led over the opening 9 by the toothed drum 10, the teeth of which engage in the perforations provided at the edge of the films in the usual manner. By this means a good register of the negative and positive films is obtained.

After leaving the brushes 6—6 and 7—7 the films are guided by the rollers 5, 11 and 12, the last mentioned roll being so disposed in regard to the toothed drum 10 that the films surround a portion of the circumference of the drum. A roll 13, symmetrical to the roll 12 and axis 14 of the drum 10 guides the negative film N and the exposed positive film $Pi$ after they leave the drum 10. The rollers 15 serve for guiding the films to the winding up reels 16 and 17.

The case 8 enclosing the lamp being tightly closed, as mentioned above, the positive film is only exposed in passing over the opening 9. In the drawing the light source consists of two lamps, the light from these lamps being reflected from the concave reflector 18 which concentrates the light on the opening 9.

The device adopted for winding and unwinding the reels and turning the drum 10, may be of any suitable construction and does not form part of my invention.

The machine is completed by a counting device 19 by which the length of the exposed film may be read off and by a stopping device by means of which the machine including the motor may be stopped instantaneously and the light extinguished when one or the other of the two films happen to tear. In the drawing this device consists of levers 20 pivoted on axes 21 and carrying rolls 22 at their free ends which rest on the films being unwound. If one of these films is torn, said arm falls abruptly and the arm 23 then interrupts the electric current.

The machine described above operates continuously and it enables absolutely sharp positive copies to be made, owing to the two films being pressed against each other in passing round the drum 10.

The films are automatically unwound and wound from and on the reels. The negative film is always wound up with the coating inside, this avoiding all intermediate operations when a new copy has to be made. For this purpose the winding up reel is simply transferred to the other side of the machine.

In this machine no lateral guides are required in exposing the films, and it will be noticed that in this machine all mechanism of intermittent action is avoided. The winding and unwinding reels can be easily removed from their supports and be replaced by two reels carrying films of 1000 meters to be cleaned and measured. The toothed drum 10 can also be used for imprinting on the positive film some trade mark, signature or text of any kind. For this purpose the edge of the drum is provided with printing characters 10a, as shown in Figure 2, the necessary ink being furnished by any suitable means, some ink of unaltering and quick drying property being preferable.

What I claim and desire to secure by Letters Patent of the United States is:

1. A rotary machine for producing copies of cinema films, comprising reels for unwinding and winding up the perforated positive and negative films, a toothed drum for conducting superposed portions of said films in an arc of a circle, and means on the drum to imprint said positive film, and a lamp to expose said superposed portion of said positive film.

2. A rotary machine for producing positive copies of cinema films, comprising reels for unwinding and winding up the perforated negative and positive films, a drum for conducting the superposed portions of said films in an arc of a circle, a lamp on the side of the films opposite the drum, said drum being provided with teeth for engaging the perforations of the films, and raised characters on the periphery of the drum for imprinting the positive film.

3. A rotary machine for producing copies of cinema films comprising reels for unwinding and winding up the perforated positive and negative films, a toothed drum for conducting superposed portions of said films in an arc of a circle, means on the drum to imprint said positive film, a lamp on the side of the films opposite the drum, and automatic means for stopping the machine and shutting off the lamp, when one of the said films is torn.

4. A rotary machine for producing positive copies of cinema films, comprising reels for unwinding and winding up the perforated negative and positive films, a drum for conducting the superposed portions of said films in an arc of a circle, a lamp on the side of the films opposite the drum, said drum being provided with teeth for engaging the perforations of the films, and raised characters on the periphery of the drum for imprinting the positive film.

5. A drum for use in a machine for printing cinema films, said drum being so located in the machine that it will hold the negative and positive films in contact for photographic printing, and provided with teeth to engage the perforations of said films, and raised characters on the periphery thereof for imprinting the positive film during such photographic printing.

6. A rotary machine for producing copies of cinema films comprising reels for unwinding and winding up the perforated positive and negative films, a toothed drum for conducting superposed portions of said films in an arc of a circle, means on the drum to imprint said positive film, a lamp on the side of the films opposite the drum, and a counting device for measuring the length of the exposed positive film.

In testimony whereof I have signed my name to this specification.

ALFRED DE BRAYER.